(12) United States Patent
Dhawan

(10) Patent No.: US 8,571,342 B2
(45) Date of Patent: Oct. 29, 2013

(54) IMAGE PROCESSING AND GENERATION OF FOCUS INFORMATION

(75) Inventor: Anuj Dhawan, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 1376 days.

(21) Appl. No.: 12/199,594

(22) Filed: Aug. 27, 2008

(65) Prior Publication Data

US 2010/0054597 A1 Mar. 4, 2010

(51) Int. Cl.
  G06K 9/40 (2006.01)
  G06K 9/62 (2006.01)
(52) U.S. Cl.
  USPC .......................... 382/255; 382/224
(58) Field of Classification Search
  USPC .......................... 382/173, 224, 255
  See application file for complete search history.

(56) References Cited

U.S. PATENT DOCUMENTS

| 2002/0046009 A1* | 4/2002 | Devaquet et al. ................. 703/1 |
| 2003/0068100 A1* | 4/2003 | Covell et al. ................... 382/305 |
| 2006/0188243 A1* | 8/2006 | Jung ............................ 396/100 |

OTHER PUBLICATIONS

Wikipedia, the free Encyclopedia, "K-means algorithm", dated Sep. 17, 2008, pp. 1-4.

* cited by examiner

*Primary Examiner* — John Strege
(74) *Attorney, Agent, or Firm* — Kilpatrick Townsend & Stockton LLP

(57) ABSTRACT

Embodiments herein include a focus evaluator configured to categorize portions of image content into different groupings depending on a respective focus value derived for each portion of the image content. The focus evaluator compares relative sizes of the different groupings to identify one or more groupings representative of an overall focus quality associated with the image content. Based on the identified one or more groupings, the focus evaluator generates the overall focus value for the image content.

31 Claims, 11 Drawing Sheets

IMAGE PROCESSING AND GENERATION OF FOCUS INFORMATION

BACKGROUND

Conventional image processing is any form of signal processing for which the input is an image, such as photographs or frames of video. The output of image processing can be either an image or a set of characteristics or parameters related to the image. Most image-processing techniques involve treating the image as a two-dimensional signal and applying standard signal-processing techniques to it.

In conventional image processing, image segmentation refers to the process of partitioning a digital image into multiple regions (such as multiple sets of pixels). After segmenting the image into different regions, the conventional image processing includes analyzing the segments to produce an output such as a focus value. According to certain conventional focus algorithms, a focus window is assumed to be the center of an image.

The goal of segmentation is to simplify or change the representation of an image into something that is more meaningful and easier to analyze. Image segmentation can include locating objects and boundaries (lines, curves, etc.) in images. The result of image segmentation identifies a region located near the center of the image—where each pixel located in a particular region are similar with respect to some characteristic or computed property (such as color, intensity, or texture). However, adjacent regions include pixels that are significantly different with respect to the those characteristics.

BRIEF DESCRIPTION

Current conventional image processing systems suffer from a variety of deficiencies. Specifically, such conventional image processing systems generally do not create a useful value representing an overall focus of an image.

For example, an image can have some regions that are considered to be of high-focus and some regions that are considered to be of low-focus. The high-focus regions typically represent a foreground of the image while the low-focus regions represent a background of the image.

When creating an overall focus value for a respective image, conventional image processing systems process groupings of pixels from both the high-focus foreground and the low-focus background regions to generate an overall focus value for the image. In other words, conventional image processing systems create an overall focus for an image based on all segments or regions of an image. In such an instance, since the overall focus value is based on all pixels from high-focus regions such as foreground, medium-focus regions, and low-focus regions such as background, the image's resulting overall focus value may not be representative of the respective image.

More specifically, focus values produced by conventional image processors can indicate that the respective image is less focused merely because of the presence of the background or low focus regions in an image. A large part of an image may purposefully be blurry, while a region of interest in the respective image may be in perfect focus. However, according to conventional image processing systems, mere presence of a background in the respective image will cause the image to be assigned a lower focus quality value because the background is taken into account when producing the overall focus value. Hence, conventional image processing systems may fail to provide the viewer with an accurate indication of the focus level for a respective image.

Techniques discussed herein significantly overcome the deficiencies of conventional applications such as those discussed above. As will be discussed further, certain specific embodiments herein are directed to a focus evaluator that generates an overall focus value for an image that reflects the focus level of the image's most relevant content.

For example, according to embodiments herein, a focus evaluator categorizes portions of image content into different groupings depending on a respective focus value derived for each portion of the image content. The focus evaluator compares relative sizes of the different groupings to identify one or more groupings that are representative of an overall focus quality associated with the image content. Based on the identified one or more groupings, the focus evaluator generates an overall focus value for the image content.

In furtherance of the above example, assume that the focus evaluator receives and processes an image having background content in low-focus and foreground content in high-focus. Assume further that the amount of pixels in the foreground account for 51% of the image's content, and the amount of pixels in the background account for 49% of the image's content.

According to embodiments herein, the focus evaluator partitions the image into multiple portions and determines a focus value for each of the multiple portions. Each portion of content from the foreground will have a relatively high focus value and each portion of content from the background will have a relatively low focus value.

As mentioned above, the focus evaluator categorizes the low-focus portions of image content into a first grouping (i.e. a low-focus grouping). The focus evaluator categorizes the low-focus portions of image content into a second grouping (i.e. a high-focus grouping). Note that use of a first and second grouping is shown by way of non-limiting example only and that the focus evaluator can categorize the portions of the image into any number of different groupings.

The focus evaluator then compares sizes of the groupings to determine which grouping of the multiple groupings has the highest number of portions of image content. In this example, assume that the first grouping, which is populated with the high-focus portions of image content from the foreground, has the highest number or most portions of image content since the foreground is the largest region in the image. In such an instance, the focus evaluator generates the overall focus value of the image based on the first grouping of content portions.

In one embodiment, the focus evaluator generates an overall focus value for the image based on individual focus values for portions of content in the high-focus grouping. For example, the focus evaluator obtains the individual focus values derived for each portion of image content in the high-focus grouping. The focus evaluator then generates an overall focus value for the image based on applying one or more arithmetic operations to the individual values.

In one embodiment, the focus evaluator generates the overall focus value based on averaging the individual values. Thus, the overall focus value is based on the pixels located within the high-focus foreground—and not on both the high-focus foreground and the low-focus background.

Note that embodiments herein are not limited to picking a single grouping of content portions to be representative of an overall focus of the image. In certain embodiments, the focus evaluator can pick multiple groupings such as those populated with highest numbers of content portions, one or more groupings larger than a threshold value, etc., as being representative of overall focus value for the image. In such an embodiment, the focus evaluator calculates an overall focus value based on individual focus values of image portions in the multiple groupings.

In another example embodiment, the focus evaluator partitions an image under test into multiple portions. Thereafter, the focus evaluator generates a focus value for each portion of content in the image. Thus, based on a focus evaluation, the focus evaluator can analyze a first portion and subsequent portions of the image content.

High color variation in a portion of the image under test indicates a sharper or in-focus image; low color variation in a portion of the image under test indicates a blurry or out-of-focus image.

In response to detecting a high amount of color variation amongst pixels in a first portion of the image under test, the focus evaluator generates a high focus value for the first portion. In response to detecting a low amount of color variation amongst pixels in a second portion of the image under test, the focus evaluator generates a relatively low focus value for the second portion. The focus evaluator can repeat this process for each portion of the image under test.

In one embodiment, the focus values can be based on a scale of 0 to 1 in which 0 is a completely out-of-focus image and 1.0 represents an in-focus image.

Subsequent evaluation can include categorizing the portions into different groupings as discussed above. For example, the focus evaluator can assign the first portion of image content to be part of a first grouping that includes portions of image content that have corresponding high color variation amongst pixels; the focus evaluator can assign the second portion of image content to be part of a second grouping that includes portions of image content having corresponding low color variation amongst pixels; and so on. In this way, each portion of the image under test can be categorized included in an appropriate focus range.

In a similar vein as mentioned above, the focus evaluator compares the relative sizes of the different groupings to detect which of the first grouping or the second grouping is larger or is populated with a highest number of portions of image content. The focus evaluator then generates an overall focus value for the image by utilizing the focus values for each of the portions in the larger of the groupings.

Other embodiments disclosed herein include any type of computerized device, workstation, handheld or laptop computer, or the like configured with software and/or circuitry to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-storage medium (e.g., tangible computer-readable medium) including computer program logic encoded thereon that, when performed in a computerized device having a coupling of a memory and a processor, programs the processor to perform the operations disclosed herein.

Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a focus evaluator, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Embodiments herein include a focus evaluator that categorizes portions of image content into different groupings depending on a respective focus value derived for each portion of the image content. The focus evaluator compares relative sizes of the different groupings to identify a particular grouping representative of an overall focus quality associated with the image content. The focus evaluator then generates an overall focus value for the image content based on the at least one particular grouping. It is understood that instead of identifying a single grouping from the different groupings, the focus evaluator can select multiple groupings from the different groupings as representative of a focus value associated with an image under test. Thus, multiple groupings of image portions can be used to generate the overall focus value for an entire image.

Figure 1:
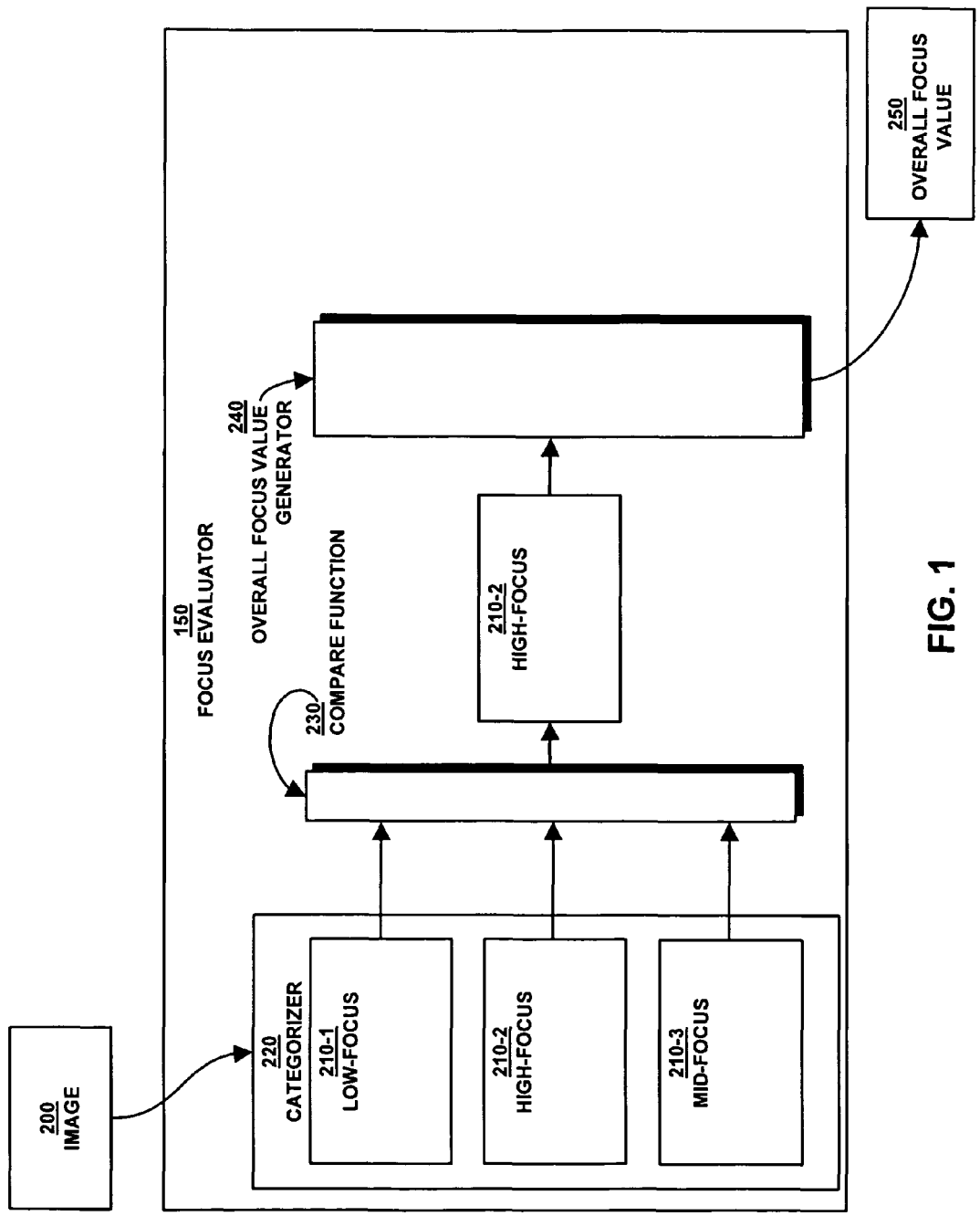
FIG. 1 is an example block diagram of a focus evaluator configured to generate an overall focus value for an image according to embodiments herein.

Now, with reference to the figures, FIG. 1 is an example block diagram of a focus evaluator 150 for generating an overall focus value 250 for a image content 200 according to embodiments herein.

As shown, focus evaluator 150 includes a categorizer 220, compare function 230, and an overall focus value generator 240 for image content 200. By way of a non-limiting example, image content 200 can be any type content such as one or more digital photographs, pictures, frames from a video sequence, etc.

During operation, the focus evaluator 150 receives or retrieves image content 200 and partitions a respective image into multiple portions.

Partitioning the image 200 can include segmenting the image 200 into sets of pixels. For example, the image 200 can be broken down into manageable portions such as sets of sixty four pixels apiece. Each set can include a grouping or eight X eight pixels of the image represented by image content 200. The set of eight X eight pixels can be a square window of pixels in the image content 200.

Each respective portion of the image represented by image content 200 can have associated color information indicating the different colors of pixels in the portion.

In one embodiment, the focus evaluator 150 processes the image content 200 and corresponding color information to calculate a focus value for each portion of the respective image under test. In general, the focus values produced for each respective portion of the image under test can be based on a scale of 0 to 1 in which 0.0 is a completely out-of-focus image and 1.0 represents an in-focus image. Thus, portions of the image content 200 assigned a low value can represent portions of the respective image under test that are considered to be out-of-focus; those portions assigned a high value can represent portions of the respective image under test that are considered to be in-focus, and so on.

The focus value for each portion can be derived based on a color distribution associated with the different pixels in the grouping. For example, if there is little or no variation in color amongst the pixels in a respective grouping, then the corresponding focus value for the respective grouping will be a relatively low number indicating an out-of-focus condition. On the other hand, if there is a large amount of variation in color amongst the pixels in a respective grouping, then the corresponding focus value for the respective grouping will be assigned a relatively high number indicating an in-focus condition.

In one embodiment, the focus evaluator 150 computes respective focus values for the portions by determining the entropy of the portions using DCT (Discrete Cosine Transform) as is known in the prior art.

The focus evaluator 150 employs a categorizer 220 to create different categories such as groupings 210-1, 210-2, and 210-3 of the portions of image content based on their corresponding focus values.

It should be noted that the focus evaluator 150 need not be limited to creating only two or three different categories. Rather, the focus evaluator 150 can create any number of categories for grouping portions of image content 200.

The categorizer 220 analyzes a respective focus value for each portion of image content 200 and keeps track of the corresponding portions as being in one of the three categories: low-focus grouping 210-1, medium-focus grouping 210-3, or high-focus grouping 210-2. The categorizer 220 creates the low-focus grouping 210-1 by populating the low-focus grouping 210-1 with those portions of image content 200 that have respective focus values within a low range such as between 0 and 0.3. The categorizer 220 creates a high-focus grouping 210-2 by populating the high-focus grouping 210-2 with those portions of image content 200 that have focus values that fall within a high range of focus values such as between 0.7 and 1.0. The categorizer 220 creates a mid-focus grouping 210-3 by populating the mid-focus grouping 210-3 with those portions of image content 200 that have focus values that fall within a high range of focus values such as between 0.3 and 0.7.

As further described herein, the focus evaluator 150 can initially place the different portions of image content 200 into different categories. Thereafter, the focus evaluator 150 performs an iterative process of redefining ranges for the categories such that the categories represent centroids, about which many of the focus values fall.

After categorizing the portions of image content 200 into different categories and potentially performing an iterative process to identify the groupings, the focus evaluator 150 selects which of the categories will be used to derive an overall focus value for the image content 200.

In one embodiment, the focus evaluator 150 implements K-means segmentation to group the image portions into different categories.

For example, the focus evaluator 150 executes a compare function 230 to determine which of the three groupings 210-1, 210-2, 210-3 contains the highest number such as majority of portions of image content 200.

Assume that the compare function 230 determines that the high-focus grouping 210-2 has the highest number of portions of image content. In such an instance, the compare function 230 passes the high-focus grouping 210-2 to overall focus value generator 240 for creation of the overall focus value 250.

In one embodiment, and as more particularly discussed in the following figures, the overall focus value generator 240 processes the focus values derived for each portion of image content in the high-focus grouping 210-2 to create an overall focus value 250 for the entire image 200.

Accordingly, embodiments herein include a unique and useful way to identify whether a respective image is in focus. For example, instead of generating overall focus value 250 based on all portions of a respective image regardless of whether the portions of image are in focus, the focus evaluator 150 generates the overall focus value 250 based on one or more categories likely to be most representative of whether a respective image is in focus or not. As an example, if more than 50% of an image is in high focus as specified by inclusion of such portions in the high-focus category 210-2, the likelihood is that the balance of portions of the image not used in generation of the overall focus value 250 are not pertinent to focus because a viewer would not perceive the minority portions of the image as being out-of-focus.

Embodiments herein produce an accurate overall focus value of a perceived focus of an image. That is, an image having focused foreground but blurry background would be perceived by a viewer as being in focus. Accordingly, a technique of utilizing most pertinent areas of the image based on size produces a more accurate indication of whether an image is in focus.

Generation of overall focus values for respective images can be useful in a number of different applications. For example, the focus evaluator 150 and related functionality can be employed to analyze frames in a video sequence. When so used, a focus value can be generated for each of the frames. Accordingly, the frames can be categorized as being in-focus or out-of-focus.

Tag information can be created for each frame or image so that images of interest, such as those having a better focus, can be more easily identified from a large group of images that would otherwise have to be searched. In other words, a user can more quickly perform a search using different tags. Thus, embodiments herein can be useful in content analysis applications.

Figure 2:
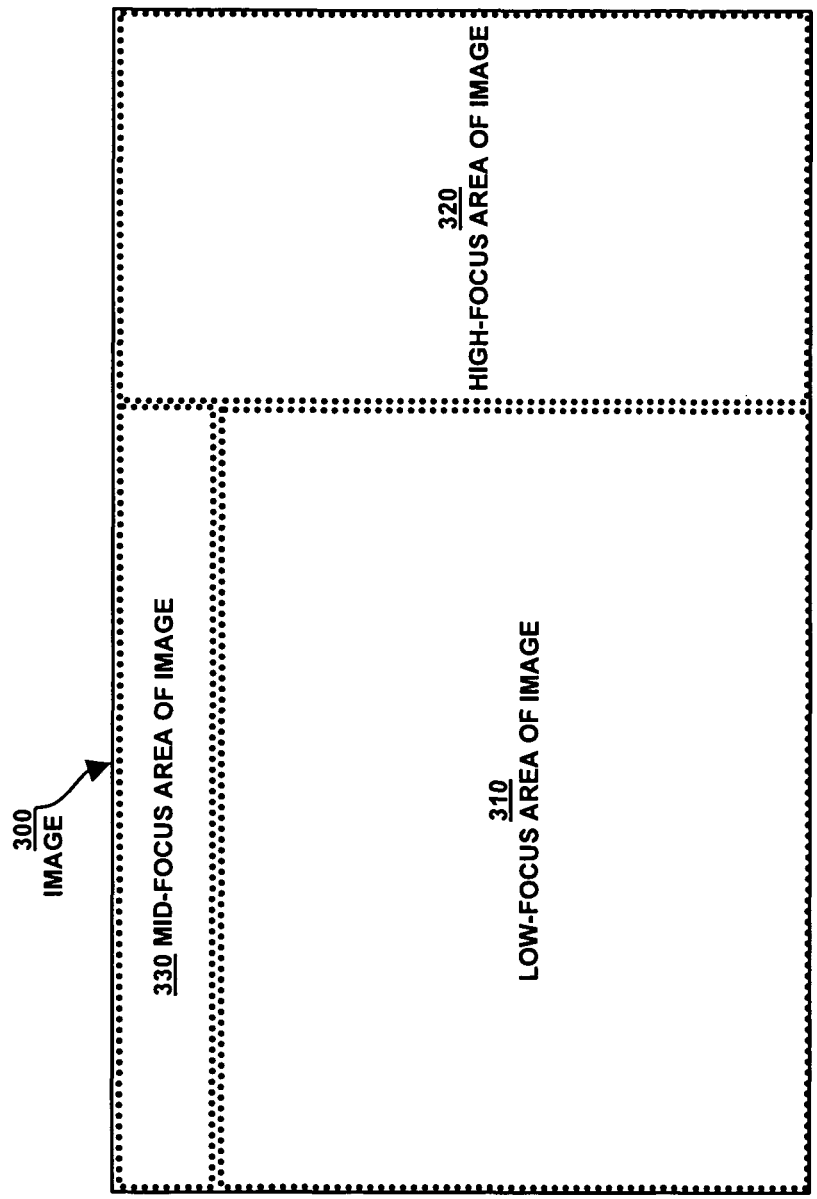
FIG. 2 is an example block diagram of an image with a high-focus area of image content, a mid focus area of image content, and a low-focus area of image content according to embodiments herein.

FIG. 2 is an example block diagram of an image 300 with a high-focus area 320 of image content, a mid focus area 330 of image content and a low-focus area 310 of image content according to embodiments herein.

In this example, the high-focus area 320 includes content portions of image 300 having a high degree of color variation amongst respective pixels. Such a high degree of color variation amongst the pixels is probably a result of a high visual sharpness for the image content depicted in the high-focus area 320.

In this example, the low-focus area 310 includes content portions of image 300 including a low degree of color variation amongst the pixels located in the low-focus area 310. Such a low degree of color variation amongst the pixels is representative of a lack of visual sharpness for the image content depicted in the low-focus area 310.

The mid-focus area 330 depicts a degree color variation amongst its pixels that falls between the range of high color variation in the high-focus area 320 and the range of low color variation in the low-focus area 310. It is understood that, in other embodiments, the low-focus area 310, high-focus 320, mid-focus 330 may not be spatially contiguous.

Figure 3:
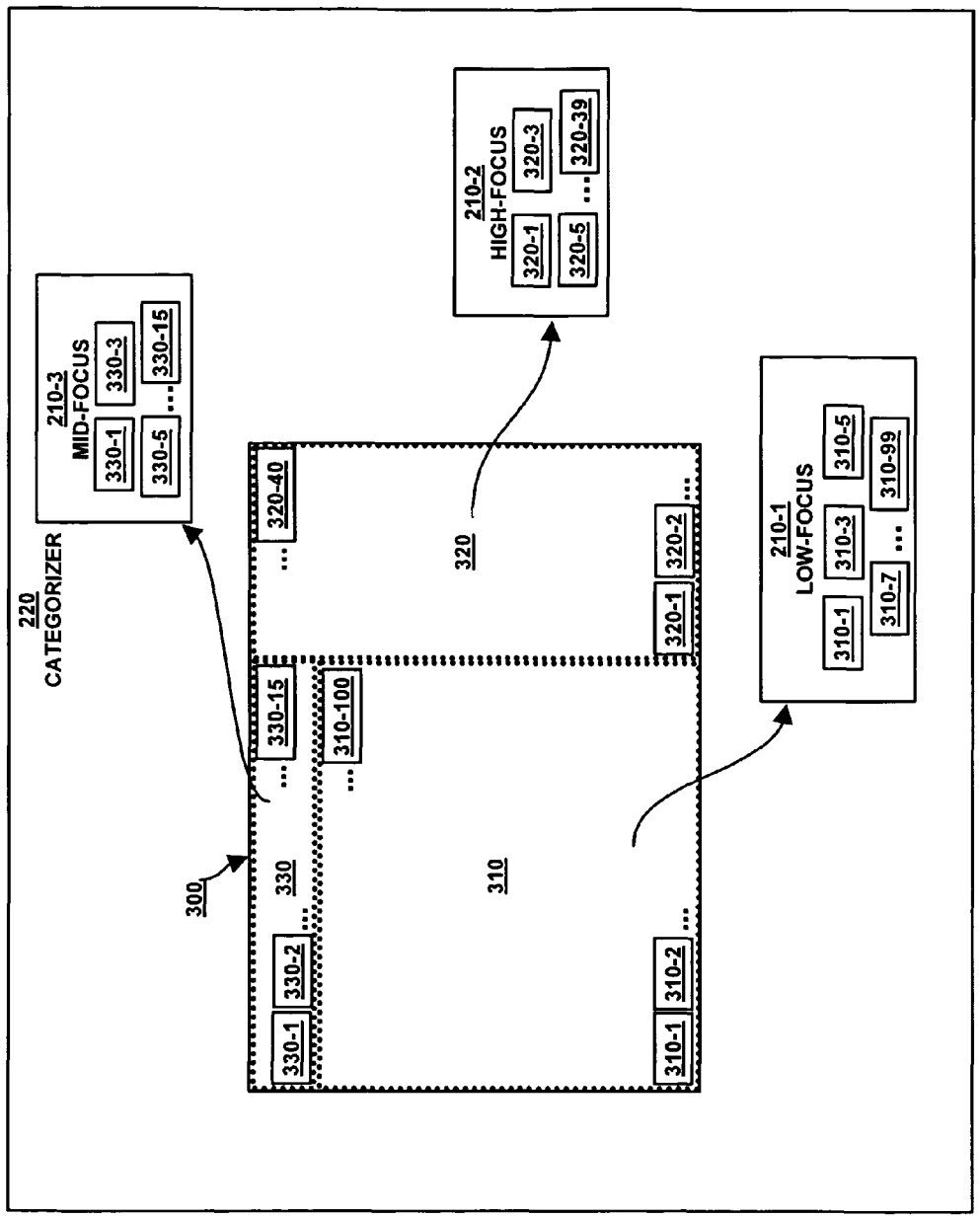
FIG. 3 is an example block diagram of a focus evaluator configured to categorize portions of image content according to embodiments herein.

FIG. 3 is an example block diagram of a focus evaluator 150 categorizing portions of image content 310-1, 310-2 . . . 310-100, 320-1, 320-2 . . . 320-40, 330-1, 330-2 . . . 330-15 from multiple areas 310, 320, 330 in an image 300 according to embodiments herein.

As depicted in FIG. 3, the focus evaluator's 150 categorizer 220 receives the image 300 (such as a previously-captured image) and partitions the image 300 to produce portions of image content 310-1, 310-2 . . . 310-100 from a low-focus area 310 of the image 300, portions of image content 320-1, 320-2 . . . 320-40 from a high-focus area 320 of the image 300, and portions of image content 330-1, 330-2 . . . 330-15 from a mid-focus area 330 from the image 300. As mentioned above, note again that the various portions of image content 310-1, 310-2 . . . 310-100, 320-1, 320-2 . . . 320-40, 330-1, 330-2 . . . 330-15 can each contain a given number of pixels, such as, for example, 64 pixels per portion of image content.

In addition to receiving or retrieving image 300, the focus evaluator 150 (or other resource of the image processing system as disclosed herein) generates a focus value for each portion of image content 310-1, 310-2 . . . 310-100, 320-1, 320-2 . . . 320-40, 330-1, 330-2 . . . 330-15. Thus, for each respective portion of image content 310-1, 310-2 . . . 310-100, 320-1, 320-2 . . . 320-40, 330-1, 330-2 . . . 330-15, the corresponding focus value indicates a degree of color variation amongst pixels in the respective portion.

The categorizer 220 categorizes the portions of image content 310-1, 310-2 . . . 310-100, 320-1, 320-2 . . . 320-40, 330-1, 330-2 . . . 330-15 into different groupings 210-1, 210-2, and 210-3 depending on the respective focus value derived for each portion of image content 310-1, 310-2 . . . 310-100, 320-1, 320-2 . . . 320-40, 330-1, 330-2 . . . 330-15.

For example, in one embodiment, the categorizer 220 initializes each of the different groupings 210-1, 210-2, and 210-3 with a unique threshold value where each threshold value or range represents a different focus level.

To reduce processing and more quickly produce an overall focus value for the image 300, the categorizer 220 can be configured to select and process only a subset of the portions of image content (such as every other portion of content from each area 310, 320, 330) rather than all of the portions of image content. For example, It is understood that a subset of the portions of image content 310-1, 310-3, 310-5, 310-7 . . . 310-99, 320-1, 320-3, 320-5 . . . 320-39, 330-1, 330-3, 330-5 . . . 330-15 can be selected for processing by the focus evaluator 150.

During a first pass of the iterative process, the focus evaluator 150 compares the focus value of each portion of image content to the threshold values (or ranges) associated with each grouping 210-1, 210-2, 210-3. For each portion of image content, the focus evaluator 150 places a given portion of image content in a grouping 210-1, 210-2 or 210-3 identified as having a threshold value nearest to the given portion of image content's focus value. Once all the portions of image content are populating the different groupings 210-1, 210-2, 210-3, the threshold values for each different grouping 210-1, 210-2, 210-3 are recalculated to reflect an average of those portions of image content populating the particular grouping.

During subsequent passes of the iterative process, the focus evaluator 150 repeats the step of comparing focus values of portions of image content to each different groupings' 210-1, 210-2, 210-3 modified threshold value (or range). Again, for each portion of image content, the focus evaluator 150 places a given portion of image content in a grouping 210-1, 210-2 or 210-3 identified as having a modified threshold value nearest to the given portion of image content's focus value. Thus, some portions of image content may migrate from one grouping in order to populate another grouping. Once all the portions of image content are again populating the different groupings 210-1, 210-2, 210-3, the threshold values for each different grouping 210-1, 210-2, 210-3 are recalculated to reflect a new average of those portions of image content populating the particular grouping. The iterative process continues in the manner discussed above until the different groupings 210-1, 210-2, 210-3 each have a threshold value (or range) that identifies an optimal grouping.

Thus, the categorizer 220 creates a low-focus grouping 210-1 populated with portions of image content 310-1, 310-3, 310-5, 310-7 . . . 310-99 that generally originate from the same area 310 of the image 300, a high-focus grouping 210-2 populated with portions of image content 320-1, 320-3, 320-5 . . . 320-39 that generally originate from the same area 320 of the image 300, and a mid-focus grouping 210-3 populated with portions of image content 330-1, 330-3, 330-5 . . . 330-15 that generally originate from the same area 330 of the image 300.

Figure 4:
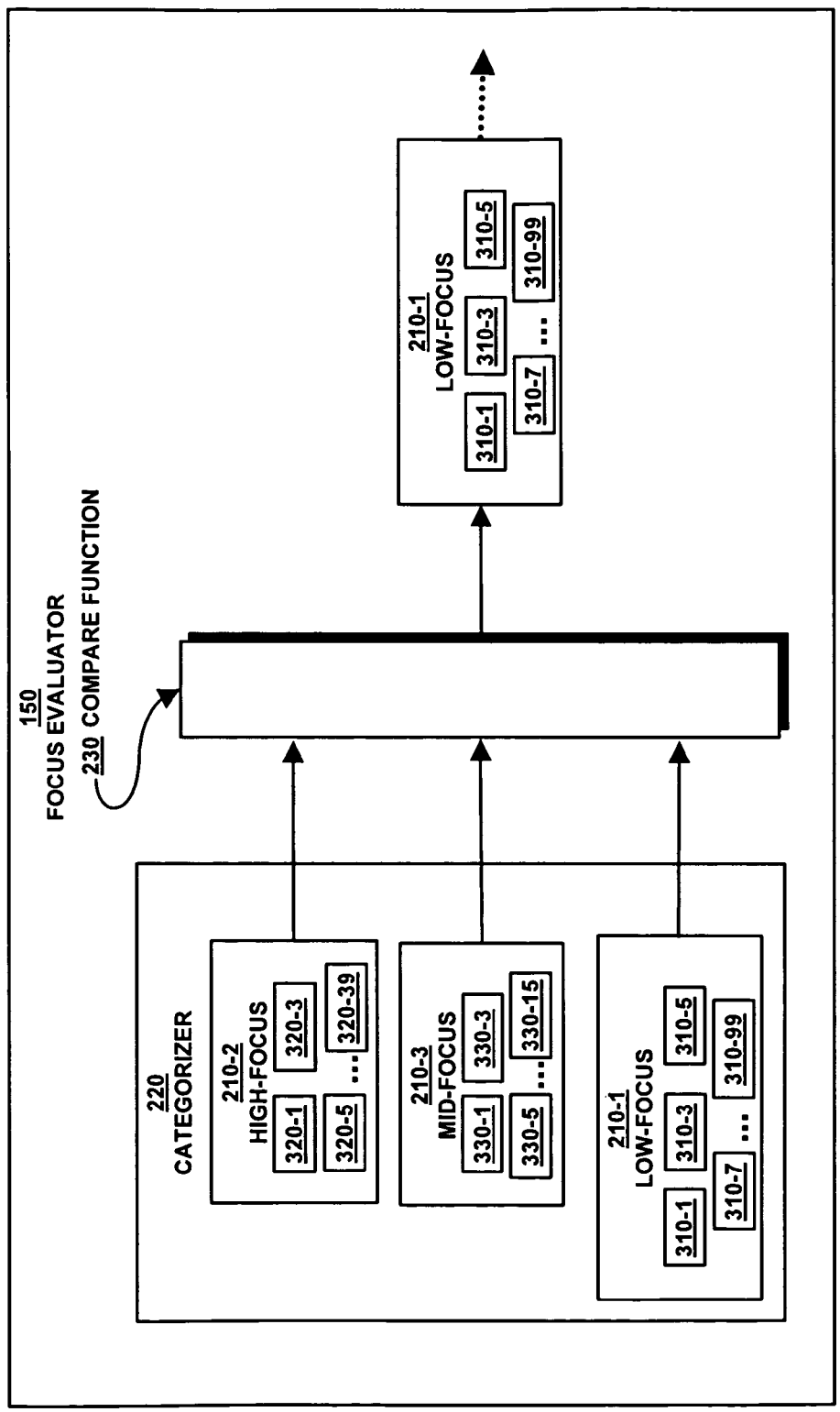
FIG. 4 is an example block diagram of a focus evaluator configured to compare the relative sizes of different groupings according to embodiments herein.

FIG. 4 illustrates an example block diagram of a focus evaluator 150 comparing the relative sizes of different groupings 210-1, 210-2, 210-3 according to embodiments herein. The focus evaluator 150 executes a compare function 230 to compare the relative sizes of each of the different groupings 210-1, 210-2, 210-3. As shown in FIG. 4, the compare function 230 can be configured to detect which of the groupings is populated with the most or majority of portions of content. In this example, the compare function 230 detects that the low-focus grouping 210-1 is populated with the highest number of portions of image content 310-1, 310-3, 310-5, 310-7 . . . 310-99.

The compare function 230 then selects the portions of image content 310-1, 310-3, 310-5, 310-7 . . . 310-99 in the low-focus grouping 210-1 to be utilized in generating an overall focus value 340 for the image 300. In this example, the focus values for the portions of image content from the image's high-focus area 320 and mid-focus area 330 will not be considered when generating the overall focus value 340 for the image 300. In this way, the focus evaluator 150 selects which of the portions and corresponding focus values are most representative of the image under test.

Figure 5:
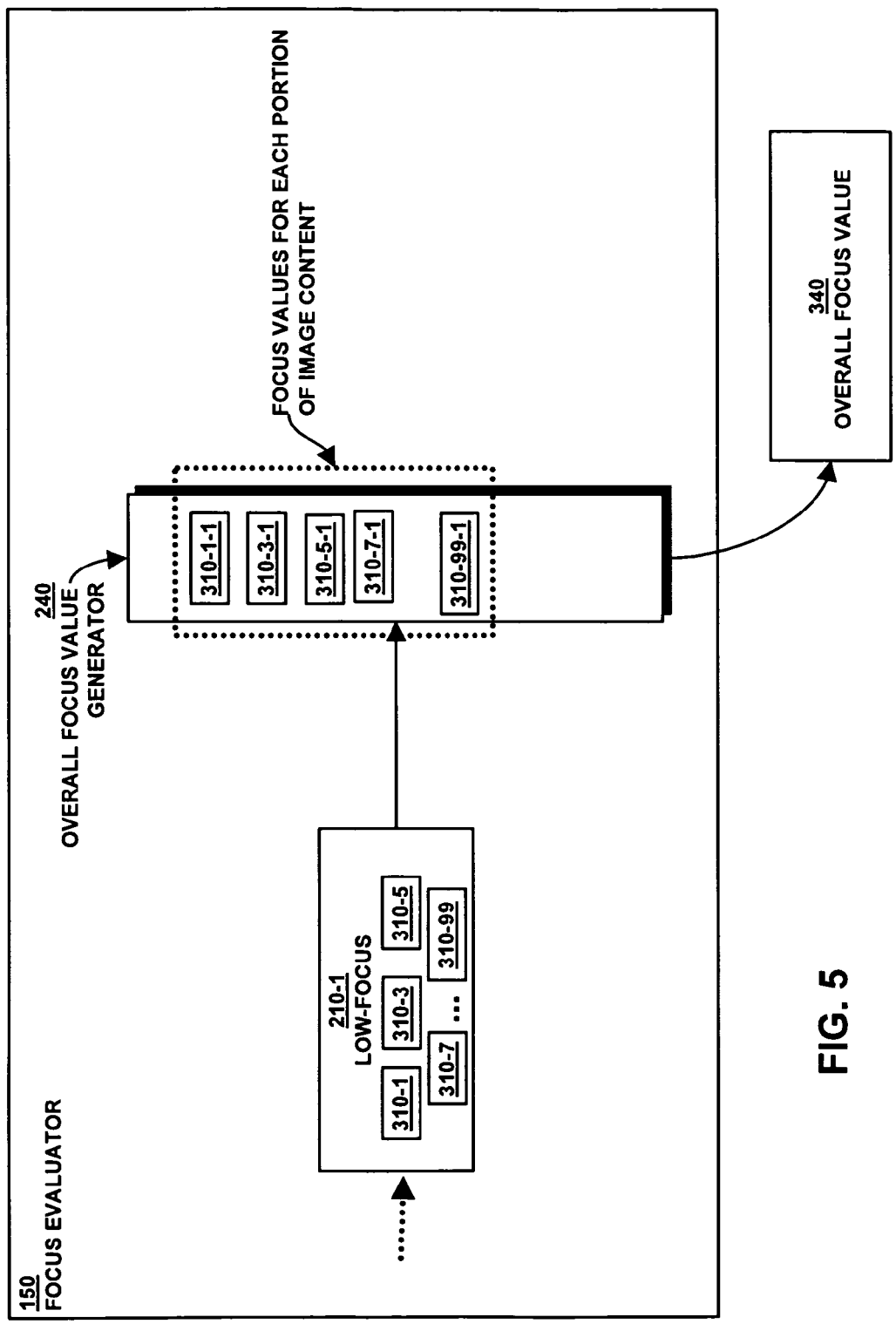
FIG. 5 is an example block diagram of a focus evaluator configured to generate an overall focus value for an image according to embodiments herein.

Turning now to FIG. 5, FIG. 5 is an example block diagram of a focus evaluator 150 generating an overall focus value 340 according to embodiments herein. Recall that in FIG. 4 that the low-focus grouping 210-1 was selected as being the most representative grouping. As depicted in FIG. 5, an overall focus value generator 240 obtains the focus values 310-1-1, 310-3-1, 310-5-1, 310-7-1 . . . 310-99-1 for each portion of image content 310-1, 310-3, 310-5, 310-7 . . . 310-99 populating the low-focus grouping 210-1. The overall focus value generator 240 then processes the focus values 310-1-1, 310-3-1, 310-5-1, 310-7-1 . . . 310-99-1 to create the overall focus value 340 for the image 300. In one embodiment, the overall focus value 340 for the image 300 is an average of the focus values 310-1-1, 310-3-1, 310-5-1, 310-7-1 . . . 310-99-1.

Figure 6:
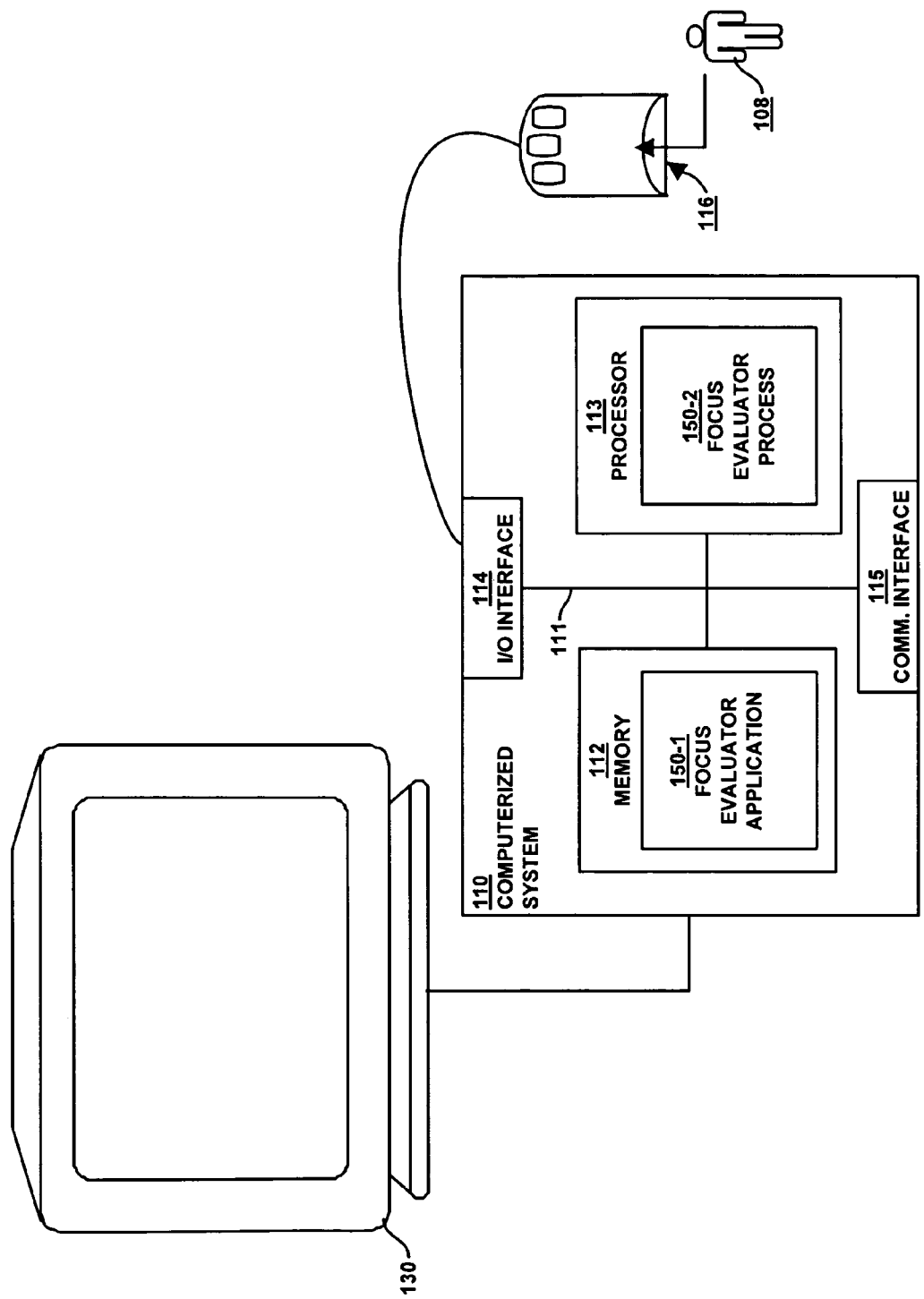
FIG. 6 is an example block diagram illustrating an example computer architecture configured to execute a focus evaluator application according to embodiments herein.

FIG. 6 is an example block diagram illustrating an architecture of a computer system 110 that executes, runs, interprets, operates or otherwise performs a focus evaluator application 150-1 and/or focus evaluator process 150-2 (e.g. an executing version of a focus evaluator 150 as controlled or configured by user 108) according to embodiments herein.

Note that the computer system 110 may be any type of computerized device or devices such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, backplane, motherboard or other circuitry that couples a memory system 112, a processor 113, an input/output interface 114, and a display 130. If so configured, the display can be used to present a graphical user interface of the focus evaluator 150 to user 108.

An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the focus evaluator application 150-1 and/or the focus evaluator process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the focus evaluator application 150-1. Execution of the focus evaluator application 150-1 in this manner produces the focus evaluator process 150-2. In other words, the focus evaluator process 150-2 represents one or more portions or runtime instances of the focus evaluator application 150-1 (or the entire application 150-1) performing or executing within or upon the processor 113 in the computerized device 110 at runtime.

The focus evaluator application 150-1 may be stored on a computer storage medium (such as a floppy disk), hard disk, electronic, magnetic, optical, memory, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the focus evaluator application 150-1 can be executed on a remotely accessible computerized device via the communication interface 115.

Note that the methods and systems described herein are not limited to a particular hardware or software configuration, and may find applicability in many computing or processing environments. Also, note again that the methods and systems may be implemented in hardware or software, or a combination of hardware and software.

The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

FIG. 7 through FIG. 11 illustrate various embodiment of the focus evaluator 150. The rectangular elements in flowcharts 700, 800, 900, 1000, 1100 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 700, 800, 900, 1000, 1100 do not necessarily depict the syntax of any particular programming language. Rather, flowcharts 700, 800, 900, 1000, 1100 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 7:
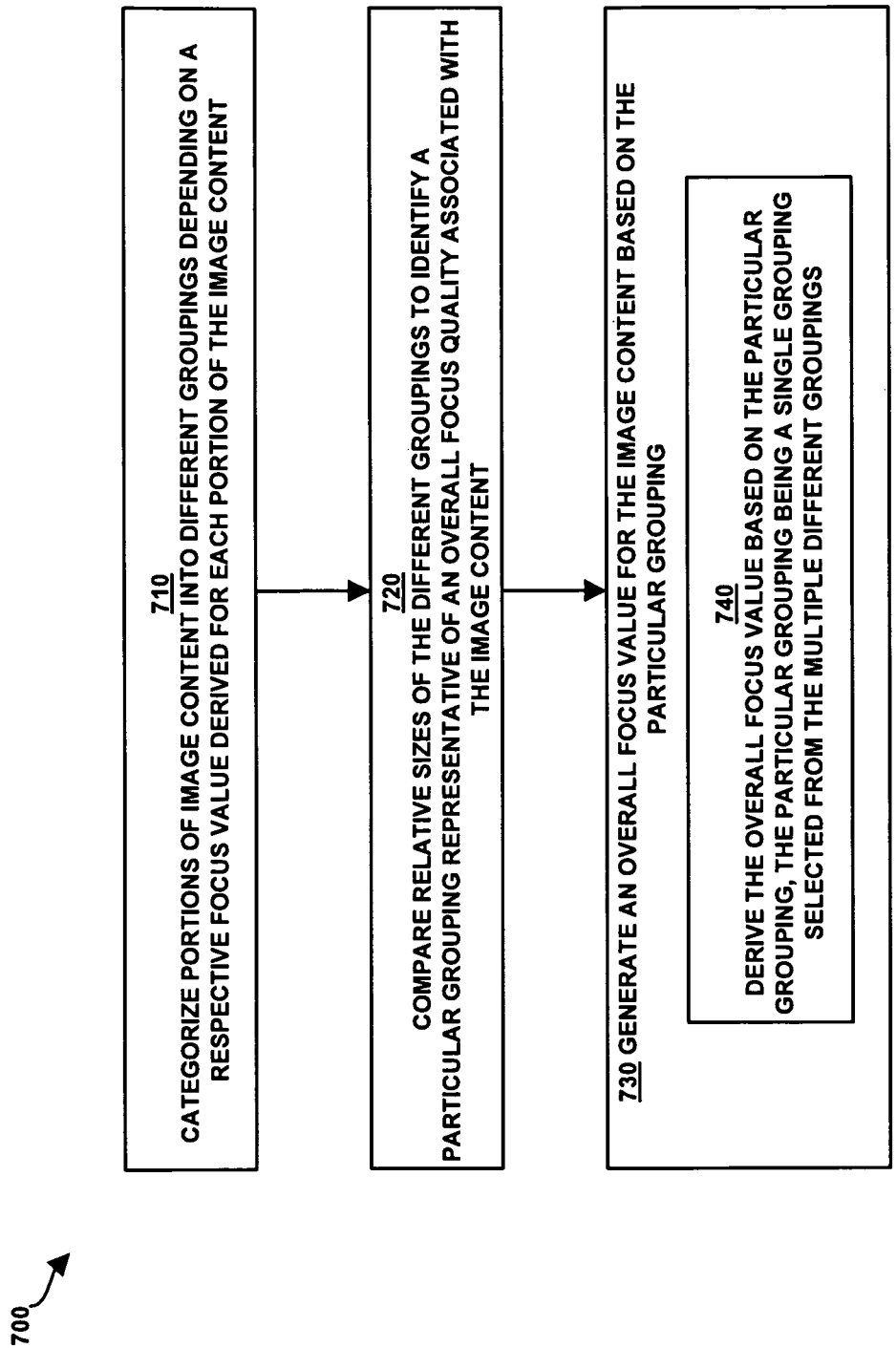
FIG. 7 is a flowchart of an example of processing steps performed by the focus evaluator to generate an overall focus value for image content according to embodiments herein.

FIG. 7 is a flowchart 700 of an example of processing steps performed by the focus evaluator 150 to generate an overall focus value for image content according to embodiments herein.

At step 710, the focus evaluator 150 categorizes portions of image content 200 into different groupings depending on a respective focus value derived for each portion of the image content 200.

At step 720, the focus evaluator 150 compares relative sizes of the different groupings to identify a particular grouping(s) representative of an overall focus quality associated with the image content 200.

At step 730, the focus evaluator 150 generates an overall focus value 250 for the image content 200 based on the particular grouping(s).

At step 740, the focus evaluator 150 derives the overall focus value 250 based on the particular grouping(s). It is understood that the particular grouping(s) can be a single grouping selected from the multiple different groupings or the particular groupings(s) can be multiple groupings—where the multiple groupings are fewer than all of the different groupings associated with the image content 200.

In one embodiment, the focus evaluator 150 compares relative sizes of the different groupings to identify a grouping of the different groupings that is populated with a highest number of portions of the image content 200. The focus evaluator 150 generates the overall focus value 250 for the image content 200 by calculating the overall focus value 250 based on the identified grouping populated with the highest number of portions of the image content 200.

In yet another embodiment, the focus evaluator 150 compares relative sizes of different groupings to identify identifying multiple groupings of the different groupings that are populated with highest numbers of portions of the image content 200. The focus evaluator 150 generates the overall focus value 250 for the image content 200 by calculating the overall focus value 250 based on a combination of focus values for each of the portions in the multiple groupings.

Figure 8:
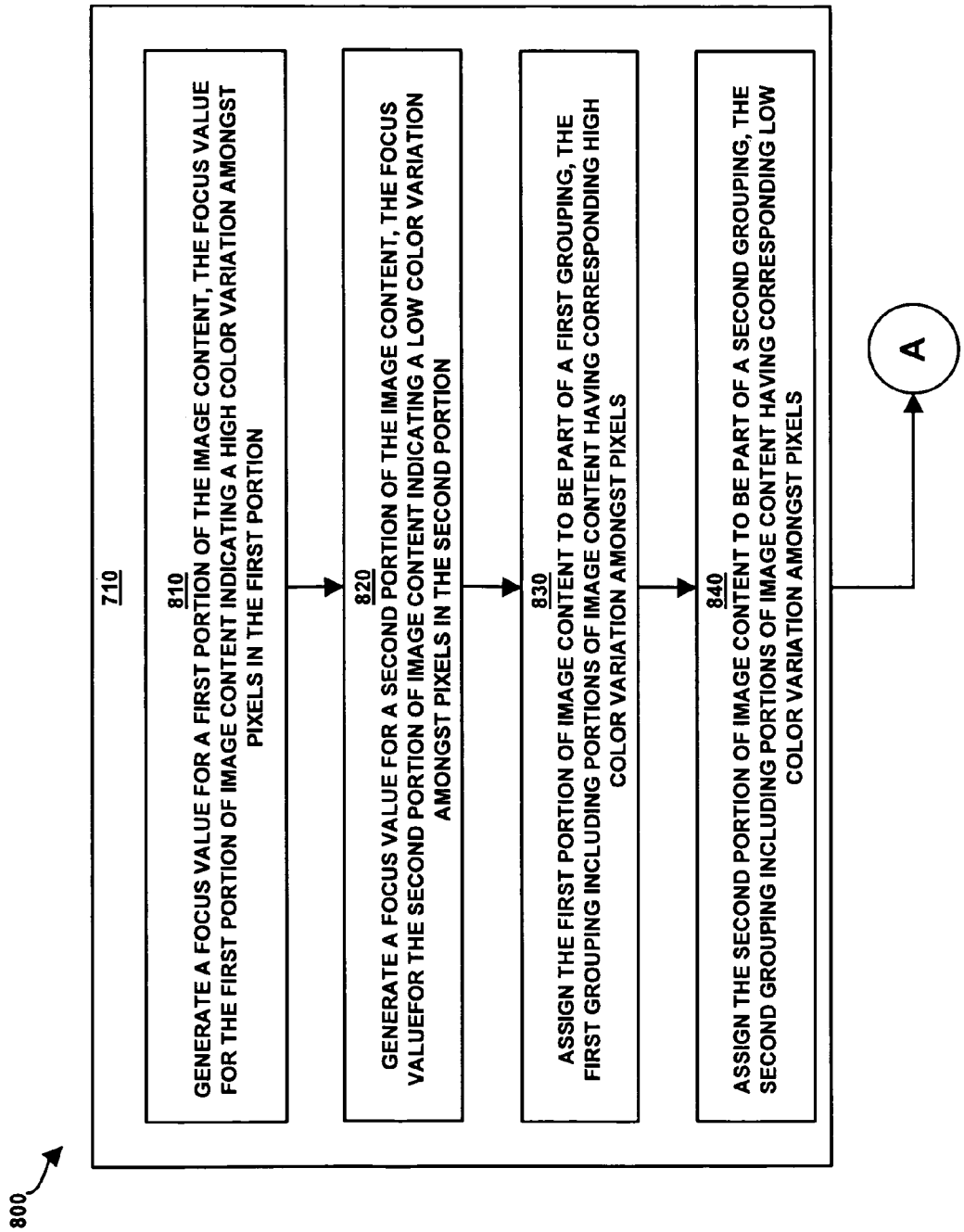
FIG. 8 is a flowchart of an example of processing steps performed by the focus evaluator to categorize portions of image content according to embodiments herein.

FIG. 8 is a flowchart 800 of an example of processing steps performed by the focus evaluator 150 to categorize portions of image content 200 according to embodiments herein.

At step 810, the focus evaluator 150 generates a focus value for a first portion of the image content 200. Assume that the focus value for the first portion of image content indicates a high color variation amongst pixels in the first portion. Thus, the first portion of image content most likely originates from a high-focus area of the image content 200.

At step 820, the focus evaluator 150 generates a focus value for a second portion of the image content 200. The focus value for the second portion of image content 200 indicates a low color variation amongst pixels in the second portion. Thus, the second portion of image content 200 most likely originates from a low-focus area (or mid-focus area) of the image.

At step 830, the focus evaluator 150 assigns the first portion of image content to be part of a first grouping, where the first grouping includes portions of image content having corresponding high color variation amongst pixels.

At step 840, the focus evaluator 150 assigns the second portion of image content to be part of a second grouping, where the second grouping includes portions of image content having corresponding low color variation amongst pixels.

Figure 9:
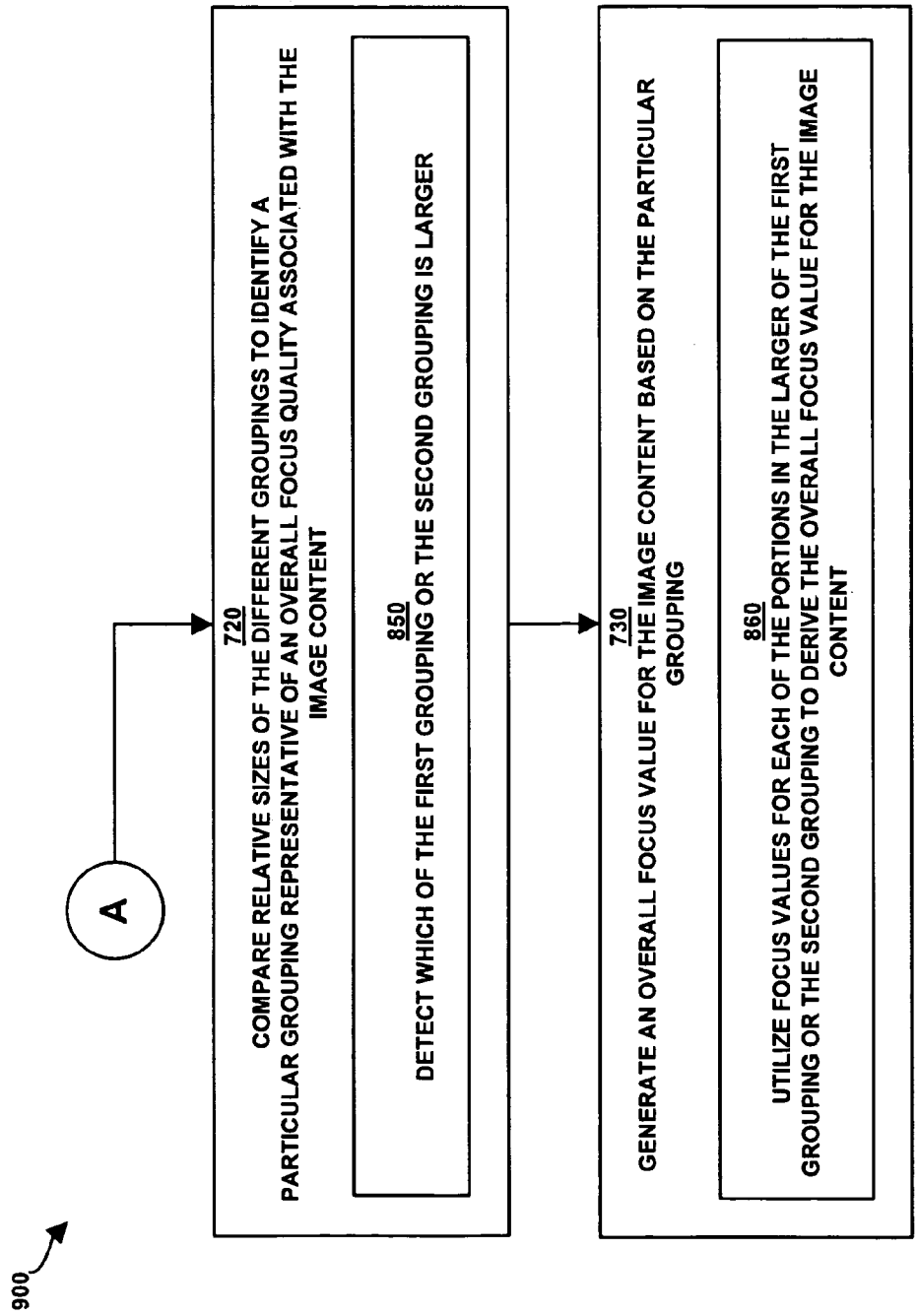
FIG. 9 is a flowchart of an example of processing steps performed by the focus evaluator to utilize focus values for portion of image content according to embodiments herein.

FIG. 9 is a flowchart 900 of an example of processing steps performed by the focus evaluator 150 to utilize focus values for each portion of image content 200 in a largest or most representative grouping according to embodiments herein.

At step 850, the focus evaluator 150 detects which of the first grouping or the second grouping is largest (i.e. which has the most portions of image content 200).

At step 860, the focus evaluator 150 utilizes focus values for each of the portions in the larger of the first grouping or the second grouping to derive the overall focus value 250 for the image content 200 (such as a previously-captured image).

Figure 10:
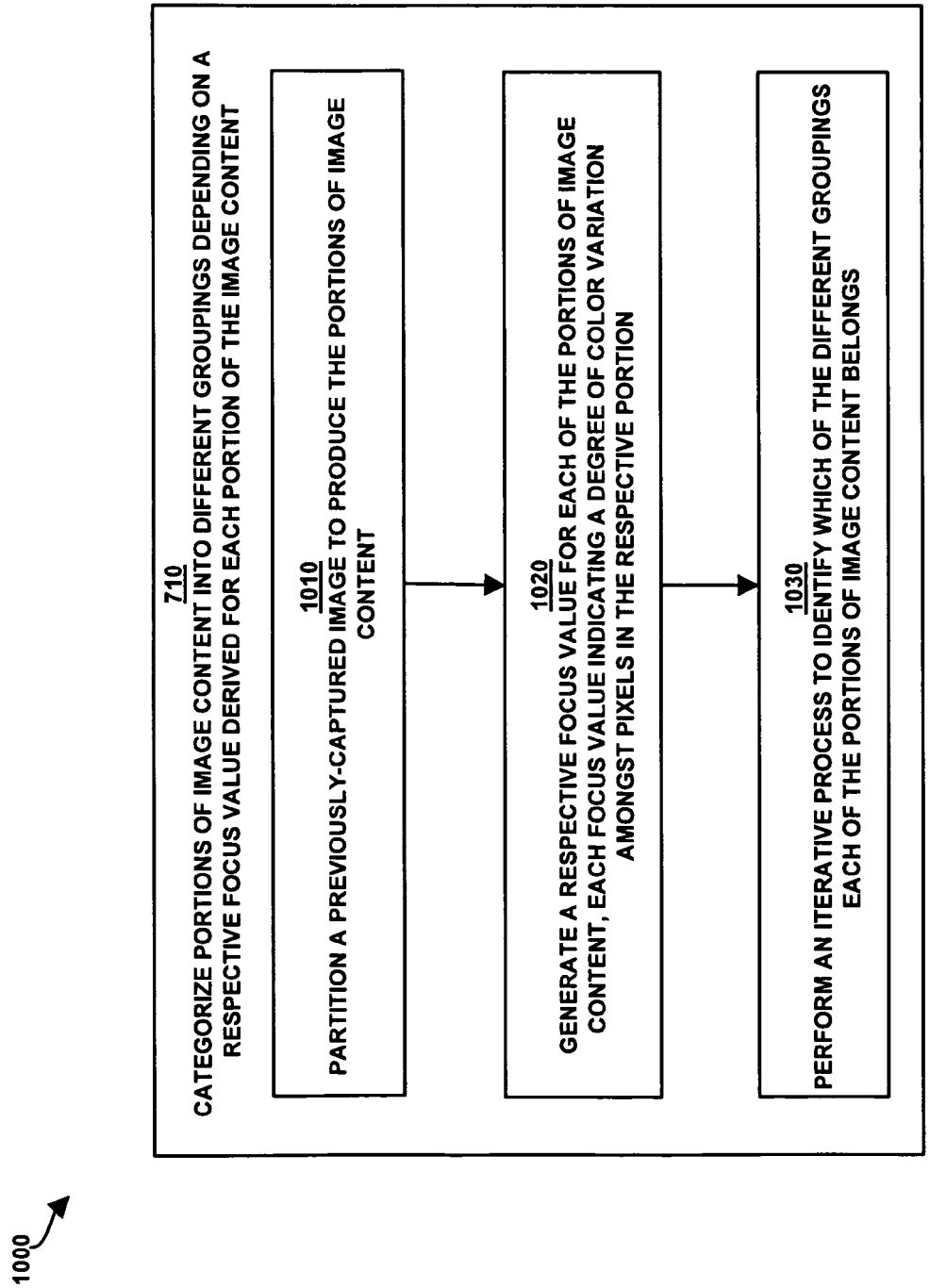
FIG. 10 is a flowchart of an example of processing steps performed by the focus evaluator to categorize portions of image content according to embodiments herein.

FIG. 10 is a flowchart 1000 of an example of processing steps performed by the focus evaluator 150 to categorize portions of image content 200 into different groupings according to embodiments herein.

At step 1010, the focus evaluator 150 partitions a previously-captured image to produce portions or segmentations of image content 200.

At step 1020, the focus evaluator 150 generates a respective focus value for each of the portions of image content 200, where each focus value indicates a degree of color variation amongst pixels in the respective portion.

At step 1030, the focus evaluator 150 performs an iterative process to identify which of the different groupings each of the portions of image content 200 belongs.

Figure 11:
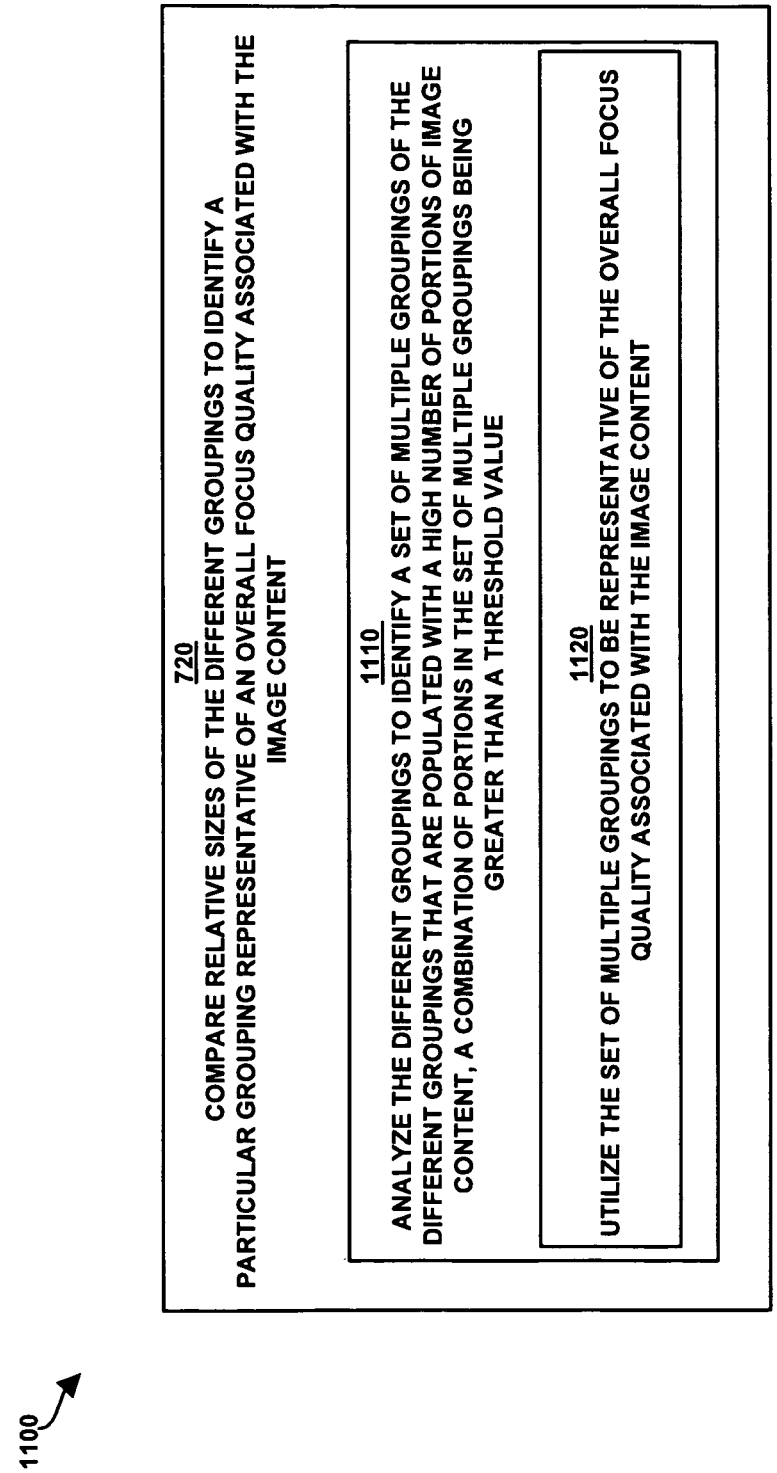
FIG. 11 is a flowchart of an example of processing steps performed by the focus evaluator to compare relative sizes of different groupings according to embodiments herein.

FIG. 11 is a flowchart 1100 of an example of processing steps performed by the focus evaluator to compare relative sizes of different groupings according to embodiments herein.

At step 1110, the focus evaluator 150 analyzes the different groupings to identify a set of multiple groupings of the different groupings that are populated with a high number of portions of image content 200, a combination of portions in the set of multiple groupings being greater than a threshold value.

At step 1120, the focus evaluator 150 utilizes the set of multiple groupings to be representative of the overall focus quality associated with the image content 200.

Throughout the entirety of the present disclosure, use of the articles "a" or "an" to modify a noun may be understood to be used for convenience and to include one, or more than one of the modified noun, unless otherwise specifically stated.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A computer-implemented method comprising:
    categorizing portions of image content into multiple groupings depending on a respective focus value associated with each portion of the image content, the focus value being derived based at least in part on a color distribution associated with a plurality of pixels comprising each portion;
    comparing sizes of each grouping of the multiple groupings to identify at least one particular grouping representative of an overall focus quality associated with the image content; and
    generating an overall focus value for the image content based on the at least one particular grouping.

2. The computer-implemented method as in claim 1, wherein generating the overall focus value includes: deriving the overall focus value based on the at least one particular grouping, the at least one particular grouping being a single grouping selected from the multiple groupings.

3. The computer-implemented method as in claim 1, wherein generating the overall focus value includes: deriving the overall focus value based on the at least one particular grouping, the at least one particular grouping including multiple but fewer than all of the multiple groupings associated with the image content.

4. The computer-implemented method as in claim 1, wherein comparing sizes of the multiple groupings to identify at least one particular grouping includes identifying a specific grouping within the multiple groupings that is populated with a highest number of portions of the image content; and
    wherein generating the overall focus value for the image content includes calculating the overall focus value based on the specific grouping populated with the highest number of portions of the image content.

5. The computer-implemented method as in claim 4, wherein calculating the overall focus value includes: processing focus values associated with each portion of image content in the specific grouping populated with the highest number of portions of the image content.

6. The computer-implemented method as in claim 4, wherein calculating the overall focus value includes: averaging the focus values for corresponding portions of image content in the identified grouping populated with the highest number of portions instead of focus values in a grouping having the lowest number of portions.

7. The computer-implemented method as in claim 1, wherein comparing the sizes includes analyzing the multiple groupings to identify a subset of groupings within the multiple groupings that are populated with a high number of portions of image content, a combination of portions in the subset of groupings being greater than a threshold value, the method further comprising: utilizing the subset of groupings to be representative of the overall focus quality associated with the image content.

8. The computer-implemented method as in claim 1, wherein comparing sizes of the multiple groupings to identify at least one particular grouping includes identifying a plurality of groupings from the multiple groupings that are populated with highest numbers of portions of the image content.

9. The computer-implemented method as in claim 8, wherein generating the overall focus value for the image content includes calculating the overall focus value based on a combination of focus values for each of the portions in the plurality of groupings.

10. The computer-implemented method as in claim 1, wherein categorizing portions of image content into multiple groupings includes:
    partitioning a previously-captured image to produce the portions of image content;
    generating a respective focus value for each of the portions of image content; and
    performing an iterative process to identify which of the multiple groupings each of the portions of image content belongs.

11. The computer-implemented method as in claim 1 further comprising: for each respective portion of the image content, generating a corresponding focus value indicating a degree of color variation amongst pixels in the respective portion.

12. A computer-implemented method comprising:
    categorizing portions of image content into multiple groupings depending on a respective focus value associated with each portion of the image content;
    comparing sizes of each grouping of the multiple groupings to identify at least one particular grouping representative of an overall focus quality associated with the image content; and
    generating an overall focus value for the image content based on the at least one particular grouping,
    wherein categorizing portions of the image content into multiple groupings comprises:

generating a focus value for a first portion of the image content, the focus value for the first portion of image content indicating a high color variation amongst pixels in the first portion;

generating a focus value for a second portion of the image content, the focus value for the second portion of image content indicating a low color variation amongst pixels in the second portion;

assigning the first portion of image content to be part of a first grouping, the first grouping including portions of image content having corresponding high color variation amongst pixels; and assigning the second portion of image content to be part of a second grouping, the second grouping including portions of image content having corresponding low color variation amongst pixels.

13. The computer-implemented method as in claim 12, wherein comparing sizes of the multiple groupings includes detecting which of the first grouping or the second grouping is larger; and wherein generating the overall focus value for the image content includes utilizing focus values for each of the portions in the larger of the first grouping or the second grouping to derive the overall focus value for the image content.

14. A computer program product including a non-transitory computer-readable medium having instructions stored thereon for processing data information, such that the instructions, when carried out by a processing device, enable the processing device to perform the operations for:

categorizing portions of image content into multiple groupings depending on a respective focus value derived for each portion of the image content, the focus value being derived based at least in part on a color distribution associated with a plurality of pixels comprising each portion;

comparing relative sizes of each grouping of the multiple groupings to identify at least one particular grouping representative of an overall focus quality associated with the image content; and generating an overall focus value for the image content based on the at least one particular grouping.

15. The computer program product as in claim 14, wherein the operations for generating the overall focus value further include operations for: deriving the overall focus value based on the at least one particular grouping, the at least one particular grouping being a single grouping selected from the multiple groupings.

16. The computer program product as in claim 14, wherein the operations for generating the overall focus value further include operations for: deriving the overall focus value based on the at least one particular grouping, the at least one particular grouping including multiple but fewer than all of the multiple groupings associated with the image content.

17. The computer program product as in claim 14, wherein the operations for comparing relative sizes of the multiple groupings to identify at least one particular grouping include operations for identifying a specific grouping within the multiple groupings that is populated with a highest number of portions of the image content; and wherein the operations for generating the overall focus value for the image content include operations for calculating the overall focus value based on the specific grouping populated with the highest number of portions of the image content.

18. The computer program product as in claim 17, wherein the operations for calculating the overall focus value include: operations for processing focus values associated with each portion of image content in the specific grouping populated with the highest number of portions of the image content.

19. The computer program product as in claim 17, wherein the operations for calculating the overall focus value include: operations averaging of focus values for corresponding portions of image content in the specific grouping populated with the highest number of portions instead of focus values in a grouping having the lowest number of portions.

20. The computer program product as in claim 14, wherein the operations for comparing the relative sizes include operations for analyzing the multiple groupings to identify a subset of groupings within the multiple groupings that are populated with a high number of portions of image content, a combination of portions in the subset of groupings being greater than a threshold value, the computer program product further performing: operations for utilizing the subset of groupings to be representative of the overall focus quality associated with the image content.

21. The computer program product as in claim 14, wherein the operations for comparing relative sizes of the multiple groupings to identify at least one particular grouping include operations for identifying a plurality of groupings from the multiple groupings that are populated with highest numbers of portions of the image content.

22. The computer program product as in claim 21, wherein the operations for generating the overall focus value for the image content include operations for calculating the overall focus value based on a combination of focus values for each of the portions in the plurality of groupings.

23. The computer program product as in claim 14, wherein the operations for categorizing portions of image content into multiple groupings include operations for:

partitioning a previously-captured image to produce the portions of image content;

generating a respective focus value for each of the portions of image content; and performing an iterative process to identify which of the multiple groupings each of the portions of image content belongs.

24. The computer program product as in claim 14 further including instructions to support operations of: generating a corresponding focus value indicating a degree of color variation amongst pixels for each respective portion.

25. A computer program product including a non-transitory computer-readable medium having instructions stored thereon for processing data information, such that the instructions, when carried out by a processing device, enable the processing device to perform the operations for:

categorizing portions of image content into multiple groupings depending on a respective focus value derived for each portion of the image content;

comparing relative sizes of each grouping of the multiple groupings to identify at least one particular grouping representative of an overall focus quality associated with the image content; and generating an overall focus value for the image content based on the at least one particular grouping, wherein the operations for categorizing portions of the image content into multiple groupings include operations of:

generating a focus value for a first portion of the image content, the focus value for the first portion of image content indicating a high color variation amongst pixels in the first portion; generating a focus value for a second portion of the image content, the focus value for the second portion of image content indicating a low color variation amongst pixels in the second portion;

assigning the first portion of image content to be part of a first grouping, the first grouping including portions of image content having corresponding high color variation amongst pixels; and assigning the second portion of image content to be part of a second grouping, the second grouping including portions of image content having corresponding low color variation amongst pixels.

26. The computer program product as in claim 25, wherein the operations for comparing relative sizes of the multiple groupings include operations for detecting which of the first grouping or the second grouping is larger; and wherein the operations for generating the overall focus value for the image content include operations for utilizing focus values for each of the portions in the larger of the first grouping or the second grouping to derive the overall focus value for the image content.

27. A computer system comprising:

a processor;

a memory unit that stores instructions associated with an application executed by the processor; and an interconnect coupling the processor and the memory unit, enabling the computer system to execute the application and perform operations of:

categorizing portions of image content into multiple groupings depending on a respective focus value derived for each portion of the image content;

comparing relative sizes of the multiple groupings to identify at least one particular grouping representative of an overall focus quality associated with the image content; and generating an overall focus value for the image content based on the at least one particular grouping, wherein categorizing portions of the image content into multiple groupings comprises operations of:

generating a focus value for a first portion of the image content, the focus value for the first portion of image content indicating a high color variation amongst pixels in the first portion; generating a focus value for a second portion of the image content, the focus value for the second portion of image content indicating a low color variation amongst pixels in the second portion;

assigning the first portion of image content to be part of a first grouping, the first grouping including portions of image content having corresponding high color variation amongst pixels; and assigning the second portion of image content to be part of a second grouping, the second grouping including portions of image content having corresponding low color variation amongst pixels.

28. A method comprising:

retrieving image content;

categorizing portions of the image content into multiple groupings based on respective focus quality values associated with the portions, the focus quality values being derived based at least in part on a color variation associated with a plurality of pixels of each portion; and based on sizes of the multiple groupings, producing a focus value representing a focus quality associated with the image content.

29. The method as in claim 28 further comprising:

segmenting the image content into the portions; and generating the respective focus quality values for the respective portions based on color variation amongst pixels in each portion.

30. The method as in claim 28, wherein retrieving the image content comprises selecting a frame of video content; and wherein producing the focus value includes generating a numerical value representing a focus quality associated with the frame of video content.

31. The computer-implemented method as in claim 1, wherein comparing sizes of the multiple groupings to identify at least one particular grouping comprises identifying a specific grouping within the multiple groupings that is identified based at least in part using a threshold value; and wherein generating the overall focus value for the image content comprises calculating the overall focus value based on the specific grouping.

* * * * *